United States Patent Office 2,801,823
Patented Aug. 6, 1957

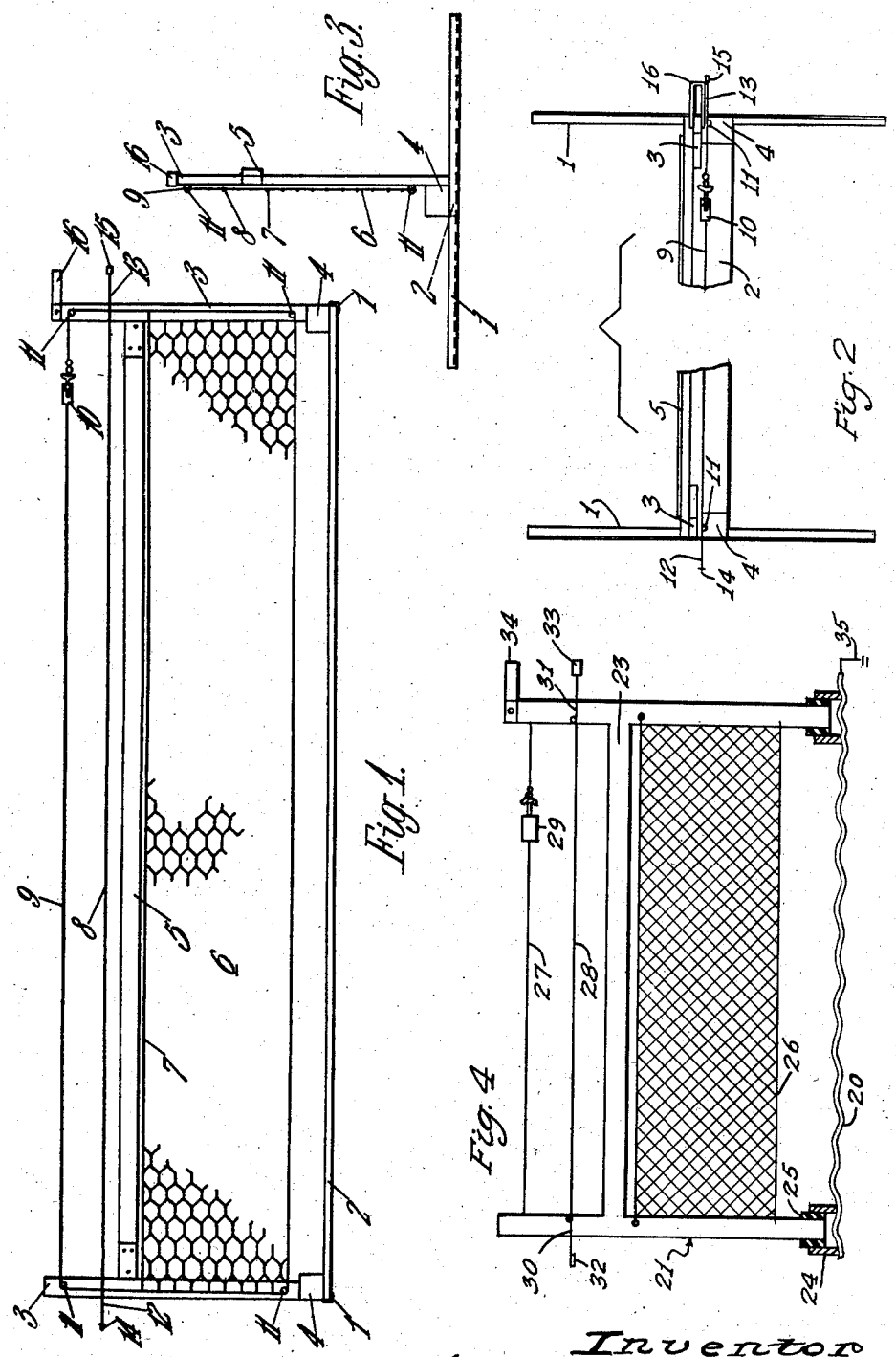

2,801,823
PORTABLE ELECTRIC FENCE
Paul Bernard Clements, Storrington, England
Application December 23, 1952, Serial No. 327,571
Claims priority, application Great Britain
December 29, 1951
3 Claims. (Cl. 256—10)

This invention consists in a hurdle constructed so that a plurality thereof can be aligned end to end to define a substantially continuous barrier or fence, each hurdle carrying an electrifiable barrier to the passage of animals, especially poultry through the hurdle when the latter rests on the ground, the barrier comprising electrodes insulated from a base comprised by the hurdle, so constructed as to prevent grass and tall growing weeds and the like from growing upright immediately below the electrodes, and thereby reduce the tendency of such plants to discharge or earth the hurdles when in use. A flat board will generally be found suitable, a compromise being reached, in practice between the width of the board needed substantially to eliminate earthing in this way and portability of the hurdles.

The electrifiable barrier may be in the form of a system of wires extending between uprights comprised by the hurdle, these wires constituting the aforesaid electrodes.

Preferably there is employed a system of wires comprising a length of wire netting stretched between and insulated from uprights comprised by the hurdle, the wire netting preferably being surmounted by one or more strands of wire defining an indistinct upper limit to the hurdle from the joint of view of poultry. The edges of the wire netting may be bounded by heavy gauge wire such as galvanised iron wire.

The hurdle suitably comprises a pair of parallel laterally extending struts joined by a stretcher board to constitute a base at each end of which is mounted an upright joined to the other upright below the respective upper end thereof by a cross bar. The rectangular opening defined by the stretcher, cross bar and the lower portions of the uprights is obturated by wire netting whilst, between the portions of the uprights above the cross bar there stretches one or more, suitably two strands of wire one above the other, the strands of wire and netting being electrically connected to each other and being provided with connections at each end of the hurdle for coupling electrically to complementary connections of like adjacent hurdles.

The coupling for establishing electrical connection between the wire or system of wires of adjacent hurdles may constitute simply short lengths of wire adapted to be twisted together and protected, for example, by a porcelain thimble, although more elaborate connections with or without mechanical coupling systems may be employed.

For mechanically coupling the hurdles end to end, chains, hooks, metal straps or other mechanical devices may be employed.

The accompanying drawing illustrates one embodiment of the invention, of which
Figure 1 is a front elevation,
Figure 2 is a fragmentary plan,
Figure 3 an end elevation, and
Fig. 4 is a front elevation of another form of the invention.

The illustrated hurdle comprises a base built up from two struts 1 of angle iron and a stretcher 2, suitably of wood, and at each end of the latter is mounted a wooden upright 3 conveniently with the aid of a wooden block 4. A wooden cross bar 5 joins the two uprights at some distance below the upper ends and the frame thus defined is obturated by a length of wire netting 6, suitably 2" mesh chicken wire, reaching down sufficiently close to the stretcher 2 to prevent poultry from wandering underneath without contacting the mesh.

The mesh referred to is bounded along each edge by a heavy gauge wire 7 suitably galvanised iron wire, and those lengths along the vertical edges continue upwards nearly to the top of the uprights and are connected by longitudinal wires 8 and 9 above the cross bar 5, wire 9 incorporating a tensioner 10.

The wires 7, 8 and 9 and the chicken mesh 6 are spaced from the uprights 3 by fence insulators 11. Connecting wires 12 and 13 attached respectively to pin 14 and socket 15 are provided for coupling adjacent hurdles together. For mechanically connecting adjacent hurdles together one of the uprights 3 is provided with a metal strap 16.

In Fig. 4, the hurdle comprises a baseboard 20 of metal sheet, preferably corrugated iron which supports an approximately rectangular metal frame 21. The frame includes end uprights 22 and a cross piece 23 located a substantial distance below the upper ends of the uprights. The lower ends of the uprights 22 are positioned in spaced sockets 24 provided on the baseboard 20 and insulation 25 in the form of a rubber or plastic length of hosing surrounds the lower end of each upright 22.

Wire netting 26 is suitably secured to the cross piece 23 and the uprights 22 with the lower end of the netting terminating a short distance above the baseboard 20 to prevent poultry from passing beneath the netting without contacting the same.

Wires 27 and 28 extend longitudinally of the frame and are secured to the uprights 22 above the cross piece 23 to define an upper barrier and the wire 27 is provided with a tensioner 29. Connecting wires 30 and 31 secured to a pin 32 and a socket 33, respectively are included to couple together adjacent hurdle units. A strap 34 carried by one of the uprights 22 is used to connect mechanically adjacent hurdle units.

It can be seen that the entire frame is electrified, and a ground 35 is provided for the baseboard 20.

I claim:
1. A hurdle of the character described, comprising a base for resting on the ground, a vertical support secured adjacent each end of the base, a cross bar extending between and secured to the supports a substantial distance below the upper ends of the supports thereby defining a rectangular opening between the cross bar, the vertical supports and the base, a wire netting substantially closing the rectangualr opening, at least one wire strand extending between the supports above the cross bar and defining an upper barrier, means electrically connecting the wire strand to the wire netting, and connectors at each end of the wire strand for coupling to connectors of similar adjacent hurdles whereby such hurdles can be aligned in end to end relationship to constitute a continuous barrier to prevent the passage of animals through the barrier.

2. A hurdle as defined in claim 1 wherein the base, cross bar and vertical supports are metal and the lower ends of the supports are mounted in sockets on the base, and insulation is interposed between each support and each socket.

3. A hurdle as defined in claim 1 wherein the vertical supports are wood and the wire netting and wire strand are secured to the supports by insulators.

References Cited in the file of this patent
UNITED STATES PATENTS

| | | |
|---|---|---|
| 357,050 | Vail | Feb. 1, 1887 |
| 1,233,230 | Hassett | July 10, 1917 |
| 1,293,335 | Chambliss | Feb. 4, 1919 |
| 2,023,835 | Heiken | Dec. 10, 1935 |
| 2,400,829 | Kennedy | May 21, 1946 |